United States Patent [19]

Gatsis

[11] Patent Number: 5,171,727
[45] Date of Patent: Dec. 15, 1992

[54] METHOD OF PREPARING A CATALYST FOR THE HYDROCONVERSION OF ASPHALTENE-CONTAINING HYDROCARBONACEOUS CHARGE STOCKS

[75] Inventor: John G. Gatsis, Des Plaines, Ill.

[73] Assignee: UOP, Des Plaines, Ill.

[21] Appl. No.: 749,810

[22] Filed: Aug. 26, 1991

[51] Int. Cl.$^5$ .............. B01J 37/18; B01J 31/12; B01J 31/34; B01J 31/36

[52] U.S. Cl. .............. 502/173; 502/171; 502/211; 208/254 H; 208/251 H; 208/209; 208/108

[58] Field of Search .............. 502/211, 171, 173; 208/112, 108, 211, 254 H, 251 H, 223, 243, 209

[56] References Cited

U.S. PATENT DOCUMENTS

| | | | |
|---|---|---|---|
| 1,876,270 | 9/1932 | Zorn | 208/108 |
| 2,091,831 | 8/1937 | Pongratz et al. | 208/108 |
| 3,131,142 | 4/1964 | Mills, Jr. | 208/108 |
| 3,161,585 | 12/1964 | Gleim et al. | 208/264 |
| 3,173,860 | 3/1965 | Gatsis | 208/254 H |
| 3,231,488 | 1/1966 | Gatsis et al. | 208/254 H |
| 3,331,769 | 7/1967 | Gatsis | 208/210 |
| 3,657,111 | 4/1972 | Gleim | 208/108 |
| 4,226,742 | 10/1980 | Bearden, Jr. et al. | 502/170 |
| 4,229,283 | 10/1980 | Sosnowski | 208/108 X |
| 4,298,454 | 11/1981 | Aldridge et al. | 208/108 X |
| 4,637,870 | 1/1987 | Bearden, Jr. et al. | 208/112 |
| 4,943,548 | 7/1990 | Gatsis | 502/173 |
| 4,954,473 | 9/1990 | Gatsis | 502/171 |

*Primary Examiner*—W. J. Shine
*Assistant Examiner*—Douglas J. McGinty
*Attorney, Agent, or Firm*—Thomas K. McBride; John G. Tolomei; John G. Cutts, Jr.

[57] ABSTRACT

A catalyst prepared by the steps which comprise: (a) adding to an asphaltene-containing hydrocarbonaceous oil charge stock a metal compound, a heteropoly acid and water; (b) converting the metal compound and heteropoly acid within the charge stock by heating the oil to a temperature from about 120° F. (43° C.) to about 500° F. (260° C.) to produce at least one organometallic compound within the charge stock; and (c) converting the organometallic compound within the charge stock under hydroconversion conditions to produce the catalyst.

15 Claims, No Drawings

5,171,727

METHOD OF PREPARING A CATALYST FOR THE HYDROCONVERSION OF ASPHALTENE-CONTAINING HYDROCARBONACEOUS CHARGE STOCKS

BACKGROUND OF THE INVENTION

The field of art to which this invention pertains is the preparation of a catalyst for the hydroconversion of asphaltene-containing hydrocarbonaceous charge stocks. More specifically, the invention relates to a catalyst prepared by the steps which comprise: (a) adding to an asphaltene-containing hydrocarbonaceous oil charge stock a metal compound, a heteropoly acid and water; (b) converting the metal compound and heteropoly acid within the charge stock by heating the oil to a temperature from about 120° F. (43° C.) to about 500° F. (260° C.) to produce at least one organometallic compound within the charge stock; and (c) converting the organometallic compound within the charge stock under hydroconversion conditions to produce the catalyst.

INFORMATION DISCLOSURE

Hydrorefining processes utilizing dispersed catalysts in admixture with a hydrocarbonaceous oil are well known. The term "hydrorefining" is intended herein to designate a catalytic treatment, in the presence of hydrogen, of a hydrocarbonaceous oil to upgrade the oil by eliminating or reducing the concentration of contaminants in the oil such as sulfur compounds, nitrogenous compounds, metal contaminants and/or to convert at least a portion of the heavy constituents of the oil such as pentane-insoluble asphaltenes or coke precursors to lower boiling hydrocarbon products, and to reduce the Conradson carbon residue of the oil.

U.S. Pat. No. 3,161,585 (Gleim et al) discloses a hydrorefining process in which a petroleum oil charge stock containing a colloidally dispersed catalyst selected from the group consisting of a metal of Groups VB and VIB, an oxide of said metal and a sulfide of said metal is reacted with hydrogen at hydrorefining conditions. This patent teaches that the concentration of the dispersed catalyst calculated as the elemental metal, in the oil charge stock is from about 0.1 weight percent to about 10 weight percent of the initial charge stock.

U.S. Pat. No. 3,331,769 (Gatsis) discloses a hydrorefining process in which a metal component (Group VB, Group VIB and iron group metals) colloidally dispersed in a hydrocarbonaceous oil is reacted in contact with a fixed bed of a conventional supported hydrodesulfurization catalyst in the hydrorefining zone. The concentration of the dispersed metal component which is used in the hydrorefining stage in combination with the supported catalyst ranges from 250 to 2500 weight parts per million (wppm).

U.S. Pat. No. 3,657,111 (Gleim) discloses a process for hydrorefining an asphaltene-containing hydrocarbon charge stock which comprises dissolving in the charge stock a hydrocarbon-soluble oxovanadate salt and forming a colloidally dispersed vanadium sulfide in situ within the charge stock by reacting the resulting solution, at hydrorefining conditions, with hydrogen and hydrogen sulfide.

U.S. Pat. No. 3,131,142 (Mills) discloses a slurry hydrocracking process in which an oil soluble dispersible compound of Groups IV–VIII is added to a heavy oil feed. The catalyst is used in amounts ranging from about 0.1 to 1 weight percent, calculated as the metal, based on the oil feed.

U.S. Pat. No. 1,876,270 (Zorn) discloses the use of oil soluble organometallic compounds in thermal cracking or in destructive hydrogenation (hydrocracking) of hydrocarbons to lower boiling products.

U.S. Pat. No. 2,091,831 (Pongratz et al) discloses cracking or destructive hydrogenation carried out in the presence of oil soluble salts of acid organic compounds selected from the group consisting of carboxylic acids and phenols with a metal of Group VI and Group VIII of the Periodic Table. The oil soluble salt is used in amounts between 4 and 20 weight percent based on the feed.

U.S. Pat. No. 4,226,742 (Bearden et al) discloses the addition of a minor amount (i.e., less than 1,000 wppm) of an oil-soluble compound of metals of Group IVB, VB, VIB, VIIB and VIII of the Periodic Table of Elements and their conversion products in the oil yield catalysts which are effective in a minor amount for the hydroconversion of hydrocarbonaceous oils.

The term "hydroconversion" is used herein to designate a catalytic process conducted in the presence of hydrogen in which at least a portion of the heavy constituents and coke precursors (as measured by Conradson carbon residue) of the hydrocarbonaceous oil is converted to lower boiling hydrocarbon products while simultaneously reducing the concentration of nitrogenous compounds, sulfur compounds and metallic contaminants.

U.S. Pat. No. 4,954,473 (Gatsis) discloses a process to prepare a catalyst prepared by the steps which comprise: (a) adding to an asphaltene-containing hydrocarbonaceous oil charge stock an oil-insoluble metal compound and water; (b) converting the oil-insoluble metal compound within the charge stock by heating the oil to a temperature from about 120° F. (43° C.) to about 500° F. (260° C.) to produce an organometallic compound within the charge stock; and (c) converting the organometallic compound within the charge stock under hydroconversion conditions to produce the catalyst.

U.S. Pat. No. 4,637,870 (Bearden, Jr., et al) discloses a hydroconversion process for converting oil, coal or mixtures thereof utilizing a catalyst prepared by first forming an aqueous solution of phosphomolybdic acid and phosphoric acid and subsequently adding this solution to a hydrocarbon material, followed by heating in the presence of hydrogen and/or hydrogen sulfide to form a solid molybdenum and phosphorus-containing catalyst.

BRIEF SUMMARY OF THE INVENTION

The invention provides a method for preparing a catalyst from organometallic compounds. A preferred use of the organometallic compounds is to produce high activity catalysts for utilization in slurry catalyst processes for hydrorefining heavy, asphaltene-containing hydrocarbonaceous liquids including petroleum crude oil and fractions therefrom, syncrudes, tar sand oils, shale oils, coal oils and for converting solid carbonaceous materials such as coal and oil shale into liquid products. An important element of the method of the present invention is the discovery that the preparation of a catalyst produced by the combination of an oxide, a sulfide or a salt of a metal selected from Group IV through Group VIII, and a heteropoly acid has a synergistic effect on the catalytic properties of the slurry catalyst produced.

One embodiment of the present invention may be characterized as a method for the preparation of a catalyst which method comprises the following steps: (a) adding to an asphaltene-containing hydrocarbonaceous oil charge stock a heteropoly acid and an oxide, a sulfide or a salt of a metal selected from Group IV through Group VIII and mixtures thereof and water; (b) converting the heteropoly acid and metal within the charge stock by heating the oil to a temperature from about 120° F. (43° C.) to about 500° F. (260° C.) to produce at least one organometallic compound within the charge stock; and (c) converting the organometallic compound within the charge stock under hydroconversion conditions including a temperature from about 650° F. (343° C.) to about 1000° F. (538° C.), a hydrogen partial pressure from about 500 psig (3448 kPa gauge) to about 5000 psig (36480 kPa gauge) and a space velocity from about 0.1 to about 10 volumes of oil feed per hour per volume of reactor to produce the catalyst.

Another embodiment of the invention may be characterized as a method for the preparation of a catalyst which method comprises the following steps: (a) adding to an asphaltene-containing hydrocarbonaceous oil charge stock a heteropoly acid and an oxide, a sulfide or a salt of a metal selected from Group IV through Group VIII and mixtures thereof and water; (b) converting the heteropoly acid and metal within the charge stock by heating the oil to a temperature from about 120° F. (43° C.) to about 500° F. (260° C.) to produce at least one organometallic compound within the charge stock; (c) converting the organometallic compound within the charge stock under hydroconversion conditions including a temperature from about 650° F. (343° C.) to about 1000° F. (538° C.), a hydrogen partial pressure from about 500 psig (3448 kPa gauge) to about 5000 psig (36480 kPa gauge) and a space velocity from about 0.1 to about 10 volumes of oil feed per hour per volume of reactor to produce the catalyst; and (d) separating the catalyst from the hydroconversion zone effluent.

Yet another embodiment of the present invention may be characterized as a method for the preparation of a catalyst which method comprises the following steps: (a) adding to an asphaltene-containing hydrocarbonaceous oil charge stock a heteropoly acid and an oxide, a sulfide or a salt of a metal selected from Group IV through Group VIII and mixtures thereof and water; (b) converting the heteropoly acid and metal within the charge stock by heating the oil to a temperature from about 120° F. (43° C.) to about 500° F. (260° C.) to produce at least one organometallic compound within the charge stock; (c) converting the organometallic compound within the charge stock under hydroconversion conditions including a temperature from about 650° F. (343° C.) to about 1000° F. (538° C.), a hydrogen partial pressure from about 500 psig (3448 kPa gauge) to about 5000 psig (36480 kPa gauge) and a space velocity from about 0.1 to about 10 volumes of oil feed per hour per volume of reactor to produce the catalyst; (d) separating the catalyst from the hydroconversion zone effluent; and (e) recycling at least a portion of the catalyst from step (d) to the hydroconversion zone.

Other embodiments of the present invention encompass further details such as exemplification of metal compounds, heteropoly acids, types of asphaltene-containing hydrocarbonaceous oil charge stocks, organometallic compound preparation conditions, and hydroconversion conditions, all of which are hereinafter disclosed in the following discussion of each of these facets of the invention.

DETAILED DESCRIPTION OF THE INVENTION

The method of preparation of the present invention is primarily used to produce high activity catalysts for utilization in slurry processes for hydrorefining heavy asphaltene-containing hydrocarbonaceous liquids.

Suitable heavy asphaltene-containing hydrocarbonaceous oil charge stocks include whole or topped petroleum crude oils, including heavy crude oils, residual oils such as petroleum atmospheric distillation tower resid (boiling above about 650° F./343° C.) and a petroleum vacuum distillation tower resid (boiling above about 1050° F./565° C.); tars; bitumen; tar sand oils, coal oils and shale oils. Particularly well suited asphaltene-containing hydrocarbonaceous oils generally contain metallic contaminants (such as nickel, iron and vanadium, for example, a high content of sulfur compounds, nitrogen compounds and a high Conradson carbon residue. The metal content of such oils may range up to 1,000 wppm or more and the sulfur content may range up to 5 weight percent or more. The gravity of such feeds may range from about −5° API to about +35° API and the Conradson carbon residue of the heavy feeds will generally be at least about 5 weight percent, more preferably from about 10 to about 50 weight percent. Preferably, the heavy hydrocarbonaceous oil possesses at least 10 weight percent boiling above about 1050° F. (565° C.) at atmospheric pressure, more preferably having at least about 25 weight percent boiling above 1050° F. at atmospheric pressure.

In accordance with the present invention, an oxide, a sulfide or a salt of a metal selected from Group IV through Group VIII of the Periodic Table of Elements is added to heavy asphaltene-containing hydrocarbonaceous oil. In addition, a heteropoly acid and water is also added to the heavy asphaltene-containing hydrocarbonaceous oil. I have unexpectedly discovered that a high activity catalyst can be prepared in accordance with the present invention.

The metal constituent of the oxide, sulfide or salt that is convertible to a solid, non-colloidal catalyst is selected from the group consisting of Groups IVB, VB, VIB, VIIB and VIII and mixtures thereof of the Periodic Table of Elements, in accordance with the Table published by E. H. Sargent and Company, Copyright 1962, Dyna Slide Company, that is, titanium, zirconium, vanadium, niobium, tantalum, chromium, molybdenum, tungsten, manganese, rhenium, iron, cobalt, nickel and the noble metals including platinum, iridium, palladium, osmium, ruthenium and rhodium. The preferred metal constituent of the oxide, sulfide or salt is selected from the group consisting of molybdenum, vanadium, chromium and iron. Suitable metal compounds which may be utilized in the present invention include molybdenum trioxide and vanadium pentoxide, for example.

When the metal compound is added to the heavy, asphaltene-containing hydrocarbonaceous oil in the presence of water, under pretreatment conditions hereindescribed, the metal compound is converted to an organometallic compound and under hydroconversion conditions herein described is converted to an active catalyst comprising from about 0.01 to about 2 weight percent, preferably from about 0.05 to about 0.5 weight percent of the same metal or metals or the metal or metals added, calculated as the elemental metal, based on the heavy, asphaltene-containing hydrocarbonaceous oil.

The water present during pretreatment is preferably available in an amount from about 0.5 to about 100 weight percent based on the asphaltene-containing hydrocarbonaceous oil charge stock.

In accordance with the present invention, a heteropoly acid is also admixed with the asphaltene-containing hydrocarbonaceous oil charge stock. Any suitable heteropoly acid may be utilized and a preferred heteropoly acid is phosphomolybdic acid. Phosphomolybdic acid is understood to mean any of the known phosphomolybdic acids including phospho-12-molybdic acid, phospho-10-molybdic acid and phospho-6-molybdic acid. A most preferred heteropoly acid is phospho-12-molybdic acid. The heterpoly acid is preferably present in an amount from about 0.025 to about 2 weight percent calculated as the elemental metal based on said charge stock.

The following examples are presented for the purpose of further illustrating the present invention and to indicate the benefits afforded by the utilization thereof.

EXAMPLE 1

A phospho-12-molybdic acid solution containing 54.3 weight percent molybdenum was prepared by placing 576 g of $MoO_3$, 38.4 g. of $H_3PO_4$ (85% reagent grade) and 2800 cc of water in a 4 liter flask. The flask was then heated overnight on a stirred hot plate. The contents of the flask were then filtered with suction through a 5 micron fritted disc filter. The insolubles were washed with 300 cc of water. The filtrate was evaporated on a steam bath and yielded 500 g of phospho-12-molybdic acid. The insolubles were dried in an oven at 125° C. to yield 177 g.

A 1.1 g sample of the previously prepared phospho-12-molybdic acid, 0.38 g of $MoO_3$ and 79 g of water were added to a flask. The flask was heated and stirred to solubilize the contents and then sonified by ultrasonic for 30 minutes. The resulting contents of the flask were transferred to an autoclave using 25 g of water for a rinse.

A Lloydminster vacuum resid in an amount of 439 g and having the characteristics presented in Table 1 was also added to the autoclave. In addition, 38 g of toluene was also added to the autoclave. The autoclave was sealed, flushed with nitrogen to remove oxygen and heated to 150° C. to remove the water and toluene. The autoclave was then cooled and pressured with a gas blend containing 10% hydrogen sulfide and 90% hydrogen to a pressure of 100 atmospheres. The autoclave was then heated to a temperature of 420° C. for two hours while maintaining a total pressure of 200 atmospheres by the addition of hydrogen. After cooling, the autoclave contents were collected, and the liquid contents were centrifuged to remove solid particulate matter. The reaction products were sampled, analyzed and the results are presented in Table 2.

| TABLE 1 | |
|---|---|
| ANALYSIS OF LLOYDMINSTER VACUUM RESID | |
| API Gravity @ 15.6° C. | 6.6 |
| Specific Gravity @ 15.6° C. | 1.0246 |
| D-1160 Distillation, °C. | |
| IBP, Vol. % | 379 |
| 5 | 455 |
| 10 | 473 |
| 20 | 509 |
| EP | 512 |
| Vol. % Over @ EP | 22.0 |
| 371° C. + Wt. % | 98.9 |
| 510° C. + Wt. % | 82.4 |
| Analysis, Wt. % | |
| Carbon | 83.6 |
| Hydrogen | 11.5 |
| Sulfur | 4.77 |
| Nitrogen | 0.51 |
| Carbon Residue | 17.39 |
| Petroleum Ash | 0.041 |
| $C_7$ Insolubles | 13.56 |
| Toluene Insolubles | 0.012 |
| Nickel, PPM | 82 |
| Vanadium, PPM | 163 |
| Iron, PPM | 34 |
| Molecular Weight | 912 |
| Furol Visc., Sec (121° C.) | 306 |
| Pour Point, °C. | 54 |
| Softening Point, °C. | 37.5 |

EXAMPLE 2

Another experiment was performed utilizing essentially the same procedure as described in Example 1 with the exception that in this experiment 1.25 g of $MoO_3$ was the sole metal catalyst precursor, the total amount of water used was 95 g, including 29 g of rinse water, the amount of Lloydminster vacuum resid was 431.7 g and the amount of toluene was 29 g. The resulting reaction products were sampled, analyzed and the results are also presented in Table 2.

EXAMPLE 3

Another comparative experiment was performed also utilizing essentially the same procedure described in Example 1 with the exception that in this experiment 1.55 g of the previously prepared phospho-12-molybdic acid was the sole metal catalyst precursor, the total amount of water used was 85.6 g including 25.6 g of rinse water, the amount of Lloydminster vacuum resid was 428.5 g and the amount of toluene was 30 g. The resulting reaction products were then sampled, analyzed and the results are also presented in Table 2. Although there are very slight variations in the amounts of material used for the three experiments, it is believed that they represent a valid comparison of the various catalyst systems which have been tested.

TABLE 2

| SUMMARY OF RESULTS | | | |
|---|---|---|---|
| Example | 1 | 2 | 3 |
| Catalyst | PMA—$MoO_3$ | $MoO_3$ | PMA |
| 510° C.+ Non-Distillable Conversion, Wt. % | 63.90 | 61.27 | 67.69 |
| Heptane Insoluble Conversion, Wt. % | 80.93 | 68.12 | 74.27 |
| Coke Yield, Weight Percent | 0.6 | 0.5 | 1.1 |
| Carbon Yield, Weight Percent | 0.5 | 0.5 | 0.75 |
| Total Liquid Product Properties | | | |
| API | 21.9 | 19.2 | 22.5 |
| Sulfur, Weight Percent | 1.28 | 2.12 | 1.38 |
| Heptane Insolubles, Weight Percent | 2.28 | 4.48 | 2.70 |
| Carbon Residue, Weight Percent | 6.63 | 9.08 | 7.10 |

From Table 2, it is readily apparent that when a catalyst is produced by the combination of an oxide, a sulfide or a salt of a metal selected from Group IV through Group VIII, and a heteropoly acid there is a synergistic effect on the catalytic properties of the slurry catalyst produced. The enhanced catalytic properties include a heptane insoluble conversion of 80.93 weight percent, sulfur reduction to 1.28 weight percent, a heptane insolubles reduction to 2.28 weight percent and a carbon residue reduction to 6.63.

The foregoing description and examples clearly illustrate the advantages encompassed by the present invention and the benefits to be afforded with the use thereof.

What is claimed:

1. A method for the preparation of a catalyst which method comprises the following steps:
   (a) adding to an asphaltene-containing hydrocarbonaceous oil charge stock a heteropoly acid and an oxide, a sulfide or a salt of a metal selected from Group IV through Group VIII and mixtures thereof and water;
   (b) converting said heteropoly acid and metal within said charge stock by heating said oil to a temperature from about 120° F. (43° C.) to about 500° F. (260° C.) to produce at least one organometallic compound within said charge stock; and
   (c) converting said organometallic compound within said charge stock under hydroconversion conditions including a temperature from about 650° F. (343° C.) to about 1000° F. (538° C.), a hydrogen partial pressure from about 500 psig (3448 kPa gauge) to about 5000 psig (36480 kPa gauge), and a space velocity from about 0.1 to about 10 volumes of oil feed per hour per volume of reactor to produce said catalyst.

2. The method of claim 1 wherein said metal is present in an amount from about 0.01 to about 2 weight percent calculated as the elemental metal, based on said charge stock.

3. The method of claim 1 wherein said water is present in an amount from about 0.5 to about 100 weight percent based on said charge stock.

4. The method of claim 1 wherein said heteropoly acid is present in an amount from about 0.025 to about 2 weight percent calculated as the elemental metal based on said charge stock.

5. The method of claim 1 wherein said organometallic compound is converted to said catalyst in the presence of a gas containing hydrogen and hydrogen sulfide.

6. The method of claim 1 wherein said asphaltene-containing hydrocarbonaceous oil charge stock is derived from the group consisting of petroleum, coal, tar sand and oil shale.

7. The method of claim 1 wherein said metal is selected from the group consisting of molybdenum, vanadium, chromium and iron.

8. A method for the preparation of a catalyst which method comprises the following steps:
   (a) adding to an asphaltene-containing hydrocarbonaceous oil charge stock a heteropoly acid and an oxide, a sulfide or a salt of a metal selected from Group IV through Group VIII and mixtures thereof and water;
   (b) converting said heteropoly acid and metal within said charge stock by heating said oil to a temperature from about 120° F. (43° C.) to about 500° F. (260° C.) to produce at least one organometallic compound within said charge stock; and
   (c) converting said organometallic compound within said charge stock under hydroconversion conditions including a temperature from about 650° F. (343° C.) to about 1000° F. (538° C.), a hydrogen partial pressure from about 500 psig (3448 kPa gauge) to about 5000 psig (36480 kPa gauge), and a space velocity from about 0.1 to about 10 volumes of oil feed per hour per volume of reactor to produce said catalyst; and
   (d) separating said catalyst from said hydroconversion zone effluent.

9. The method of claim 8 wherein said metal is present in an amount from about 0.01 to about 2 weight percent calculated as the elemental metal, based on said charge stock.

10. The method of claim 8 wherein said water is present in an amount from about 0.5 to about 100 weight percent based on said charge stock.

11. The method of claim 8 wherein said heteropoly acid is present in an amount from about 0.025 to about 2 weight percent calculated as the elemental metal based on said charge stock.

12. The method of claim 8 wherein said organometallic compound is converted to said catalyst in the presence of a gas containing hydrogen and hydrogen sulfide.

13. The method of claim 8 wherein said asphaltene-containing hydrocarbonaceous oil charge stock is derived from the group consisting of petroleum, coal, tar sand and oil shale.

14. The method of claim 8 wherein said metal is selected from the group consisting of molybdenum, vanadium, chromium and iron.

15. A method for the preparation of a catalyst which method comprises the following steps:
   (a) adding to an asphaltene-containing hydrocarbonaceous oil charge stock a heteropoly acid and an oxide, a sulfide or a salt of a metal selected from Group IV through Group VIII and mixtures thereof and water;
   (b) converting said heteropoly acid and metal within said charge stock by heating said oil to a temperature from about 120° F. (43° C.) to about 500° F. (260° C.) to produce at least one organometallic compound within said charge stock; and
   (c) converting said organometallic compound within said charge stock under hydroconversion conditions including a temperature from about 650° F. (343° C.) to about 1000° F. (538° C.), a hydrogen partial pressure from about 500 psig (3448 kPa gauge) to about 5000 psig (36480 kPa gauge), and a space velocity from about 0.1 to about 10 volumes of oil feed per hour per volume of reactor to produce said catalyst.
   (d) separating said catalyst from said hydroconversion zone effluent; and
   (e) recycling at least a portion of said catalyst from step (d) to said hydroconversion zone.

* * * * *